United States Patent
Qiao et al.

(10) Patent No.: US 8,593,693 B2
(45) Date of Patent: Nov. 26, 2013

(54) OUTPUTTING GRAY COLOR VALUES IN COLOR-MANAGED CMYK TO CMYK COLOR CONVERSIONS BASED ON INPUT GRAY COLOR VALUES

(75) Inventors: Yue Qiao, Longmont, CO (US); Nenad Rijavee, Longmont, CO (US); Vladimir V. Shestak, Fort Collings, CO (US)

(73) Assignee: Ricoh Production Print Solutions LLC, Boulder, CO (US)

( * ) Notice: Subject to any disclaimer, the term of this patent is extended or adjusted under 35 U.S.C. 154(b) by 1030 days.

(21) Appl. No.: 12/616,927

(22) Filed: Nov. 12, 2009

(65) Prior Publication Data
US 2011/0109943 A1  May 12, 2011

(51) Int. Cl.
H04N 1/40  (2006.01)
(52) U.S. Cl.
USPC .................................... 358/3.23; 358/1.16
(58) Field of Classification Search
USPC ......... 358/1.9, 2.1, 3.23, 1.16, 504, 406, 500, 358/400
See application file for complete search history.

(56) References Cited

U.S. PATENT DOCUMENTS

| | | | | |
|---|---|---|---|---|
| 5,563,989 | A | * | 10/1996 | Billyard ........................ 345/426 |
| 5,742,405 | A | * | 4/1998 | Spaulding et al. ............. 358/3.1 |
| 5,757,347 | A | * | 5/1998 | Han ................................ 345/88 |
| 6,690,489 | B1 | | 2/2004 | Jacob et al. |
| 6,873,434 | B1 | | 3/2005 | Kohler et al. |
| 7,046,393 | B2 | | 5/2006 | Zeng |
| 7,259,769 | B2 | * | 8/2007 | Diefenbaugh et al. ........ 345/604 |
| 7,453,468 | B2 | | 11/2008 | Ziobro |
| 2004/0196475 | A1 | | 10/2004 | Zeng et al. |
| 2006/0158669 | A1 | | 7/2006 | Haikin |
| 2006/0256361 | A1 | | 11/2006 | Hayase |
| 2007/0097461 | A1 | | 5/2007 | Ng et al. |
| 2007/0146744 | A1 | | 6/2007 | Kang |

FOREIGN PATENT DOCUMENTS

| | | |
|---|---|---|
| JP | 2003023546 | 1/2003 |
| JP | 2004120566 | 4/2004 |

OTHER PUBLICATIONS

Zeng, "CMYK transformation with black preservation in color management system," Jan. 2002, vol. 4663, 143, Proceeding of the SPIE abstract.
Stone et al., "Color gamut mapping and the printing of digital color images," Oct. 1988, vol. 7, Issue 4, pp. 249-292, ACM Transactions on Graphics abstract.

* cited by examiner

*Primary Examiner* — Thomas D Lee
*Assistant Examiner* — Stephen M Brinich
(74) *Attorney, Agent, or Firm* — Duft Bornsen & Fettig, LLP

(57) ABSTRACT

Methods and systems herein provide for CMYK color conversion of input image data while preserving K color values during the conversion process. A color management module is operable to convert input image data from one color space to a CMYK color space. For example, the color management module may convert the image data of one device operating in a CMYK color space to a CMYK color space of another device. In doing so, the color management module preserves or maintains the K color values of the input image data during the CMYK to CMYK color conversion. The color management module may implement such by modifying input and output ICC profiles and interpolating the perceptual lightness values of the input ICC profile within the output lookup table.

19 Claims, 6 Drawing Sheets

OUTPUTTING GRAY COLOR VALUES IN COLOR-MANAGED CMYK TO CMYK COLOR CONVERSIONS BASED ON INPUT GRAY COLOR VALUES

BACKGROUND

1. Field of the Invention

The invention relates to the field of color management, and in particular, to CMYK to CMYK color conversion of image data in a manner that preserves the gray color values of the image data upon color conversion.

2. Statement of the Problem

In color management, a device may convert colors of input image data to a color space of an output device. For example, the printer may have a CMYK color space that is used to represent the image data using various levels of Cyan (C), Magenta (M), Yellow (Y), and blacK (K). Before the image data is printed, the input image data is converted to the gamut of the CMYK printer. However, precise representation of the image data is generally not possible as information is lost or misrepresented in the conversion process. Other devices that may perform color conversion include monitors, printers, cameras, and scanners.

In certain instances, color conversion is performed between like color spaces, such as CMYK to CMYK. Such a color conversion may appear to be trivial, however, the process generally requires conversion from an input CMYK color space to a perceptual color space (e.g., CIEL*a*b*) and then to the output CMYK color space. The CIEL*a*b* color space is visualized as three dimensional color space, where every color that humans can see is uniquely located. Though the CIEL*a*b* color space is a perceptual color space, it is not a perceptually uniform color space as the Euclidean distance in the space does not correspond to the perceptual distance. For example, the magnitude of the perceptual color difference generally depends upon the color location and the changing direction in chroma and hue. CIEL*a*b* increasingly overstates the magnitudes of perceived chroma differences. In general, the human visual system (HVS) is sensitive to the color change in the neutral color area and relatively insensitive to the color change in a highly saturated color area. The CIEL*a*b* color space is also non-uniform regarding hue angle in that the thresholds of visual tolerances are a function of hue angle. If the non-uniformity of the CIEL*a*b* color space in chroma and hue is examined from another perspective, CIEL*a*b* colors have different characteristics at different locations.

A color conversion model can be generated using this data to convert CMYK color values to the CIEL*a*b* and vice versa. Generally, the relationship between CMYK color space and the CIEL*a*b* color space is nonlinear due to the interactions of cyan, magenta, yellow, and black planes, leading to more complex color conversion processing. In a color management system, color profiles that describe the color characteristics of certain devices or color spaces are used in converting color image data from a device-independent color space (e.g., CIEL*a*b*) to a device-dependent color space (e.g., CMYK) or vice versa. A color management system may include color profiles that provide information for converting color image data from device-dependent color spaces, such as CMYK or RGB, to device-independent color spaces, such as CIEXYZ or CIEL*a*b*, and back A color profile has a particular structure that is specified in International Color Consortium (ICC) standards. Within each profile is a rendering intent that establishes the intended usage of the image data (e.g., printing, displaying on computer monitor, etc.). There are four types of rendering intent: the relative colorimetric; absolute colorimetric; perceptual; and saturation. In printing, a printer's saturation rendering intent is generally used to brighten colors and make them stand out on a printed medium, whereas the perceptual rendering intent is intended to present more esthetically pleasing images.

To print CMYK jobs with preserved K in a CMYK to CMYK color conversion, a certain K color value of the input color space wherein CMYK=(0, 0, 0, K) is mapped to a K color value of the output color space C'M'Y'K'=(0, 0, 0, K'). The remaining color values are converted via standard color management. The CMYK to CMYK color conversion, however, is not available for certain types of image data processing. Examples include PostScript and PDF processing, where the color space array (CSA) and the color rendering dictionary (CRD) are merely input and output ICC profiles, respectively. One manner of solving this problem includes modifying an output CMYK profile to map "achromatic" colors to flat K color values; however, this solution generally loses valuable color information in the conversion process, causing some color values to remain as full CMYK color values instead of being forced to K color values as desired. Thus, there is a need to preserve the K color values during a CMYK to CMYK color conversion.

SUMMARY

Embodiments described herein address CMYK to CMYK color conversion by providing a color management module that is operable to convert input image data from one CMYK color space to another. For example, the color management module may convert the image data of one device operating in a CMYK color space to a CMYK color space of another device. In doing so, the color management module preserves or maintains the K color values of the input image data during the CMYK to CMYK color conversion. The color management module may implement such by modifying input and output ICC profiles. For CMYK to CMYK color transforms, a "K only" output (i.e., [000K1]) is produced if an initial or input color value is K only (i.e., [000K0]). For RGB to CMYK color transforms, a K only output (i.e., [000K1]) is produced if the input color value includes equal amounts of RGB colorants (i.e., R0=G0=B0). For Gray to CMYK color transforms, a K only output (i.e., [000K1]) is produced from the input gray value. Embodiments disclosed herein provide greater detail regarding this outputting of gray color values during the color conversion process.

In one embodiment, a method of performing CMYK to CMYK color conversion of input image data to preserve K color values in the input image data. The method generally includes converting (0 0 0 K) colors to achromatic colors in the input ICC. For example, the a* and b* color values may be set to 0 and 0. The method also generally includes determining lightness values corresponding to a 100% K value in the input ICC profile. The method also includes generating an output lookup table from a device independent color space to the CMYK color space color conversion (e.g., CIEL*a*b* to CMYK color conversion lookup table), converting the CIEL*a*b* color values corresponding to (0, 0, 0, K) color values in the input profile to (0, 0, 0, K') color values in the output lookup table, and converting the input image data from an input CMYK color space to an output CMYK color space via the input lookup table and the output lookup table.

The method may also include interpolating the determined lightness values corresponding to (0 0 0 K) input values within a "neutral axis" of the output lookup table. For example, the method may further include generating the output lookup tables based on a rendering intent (e.g., relative colorimetric, perceptual, or saturation).

The method may also include determining lightness boundary values in the neutral axis of the output lookup table, converting the neutral axis to (0 0 0 K') for the lightness values above the boundary values. The colors with lightness values below the boundary values are typically not modified for perceptual and saturation rendering intents. The lightness boundaries may be determined based on the lightness values L* of (0, 0, 0 100%) in the input ICC profile. For example, the lightness boundaries $L_{k+}$ and $L_{k-}$ may be grid points in the CLUT of B2A1 tag and are served as min and max to L*.

For the relative colorimetric rendering intent, the method may include mapping (0 0 0 100%) of input color to (0 0 0 100%) of the output color. This may be achieved by setting values CMYK values to [0 0 0 100] for both [$L_{k+}$ 00] and nodes [$L_{k-}$ 00]. To minimize the error of this conversion, the size of the output color lookup table is preferably increased. For the grid points with L>$L_{k-}$, K values may be obtained by interpolating L values using the portion of C=0, M=0, Y=0, K>0 of the color lookup table generated from A2B1 of the output ICC profile, and then setting C=0, M=0, and Y=0.

For the perceptual rendering intent or the saturation rendering intent, the method may include converting the CMYK value for each L [L 0 0] node to a L' a' b' value using the lookup table generated from A2B0 tag of the output ICC profile. For the grid points with L≥$L_{k+}$, K values may be obtained by interpolating L' values using the portion of C=0, M=0, Y=0, K>0 of the lookup table generated from the output ICC profile with the perceptual rendering intent, and then setting C=0, M=0, and Y=0.

Generating an output lookup table from a device independent to CMYK color conversion lookup table may include increasing the size of the color conversion lookup table that is derived from the device independent color space to the CMYK color space color conversion.

In another embodiment, a printing system is operable to convert image data from an input CMYK color space to an output CMYK color space while preserving K color values in the input image data. The printing system includes a color management module operable to access a CMYK to device independent color conversion lookup table and an input ICC profile, convert the input ICC profile to an input lookup table based on the CMYK to device independent color conversion lookup table, limit perceptual color values in the input lookup table where K color values are present in the input lookup table, and determine a first set of perceptual lightness values in the input lookup table where K values in the input lookup table are greater than a threshold value. The color management module also generates an output lookup table from a device independent to CMYK color conversion lookup table, converts the determined perceptual lightness values of the input lookup table to output lightness values in the output lookup table, and converts the input image data from the input CMYK color space to the output CMYK color space via the input lookup table and the output lookup table. The printing system also includes a printer operable to print the converted image data to a tangible medium.

In another embodiment, a color management system is operable to convert image data from an input color space (e.g., a CMYK color space, an RGB color space, or a grey color) to an output CMYK color space. The color management system includes a processor, an input ICC profile, and an output ICC profile that includes a B2A lookup table. The processor is operable to convert the input ICC profile to CIEL*a*b* color values, determine lightness values in the ICC profile for a plurality of rendering intents, increase a size of the B2A lookup table, determine a lightness boundary of the B2A lookup table, interpolate the determined lightness values within the output ICC profile according to the lightness boundary, and convert the image data from the input color space to the output CMYK color space via the converted ICC profile and the output ICC profile.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF THE EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
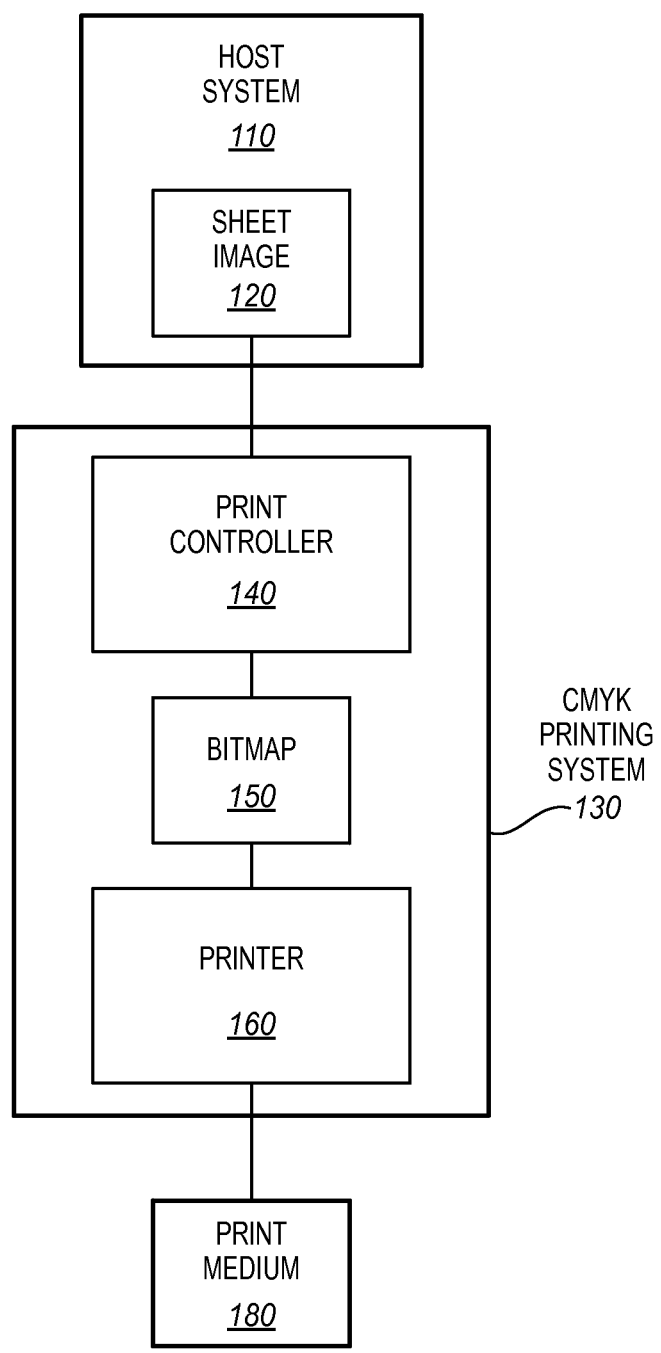
FIG. 1 is a block diagram illustrating a printing system in an exemplary embodiment.

FIG. 1 is a block diagram illustrating a printing system 130 in an exemplary embodiment. A host system 110 is in communication with the printing system 130 to print a sheet image 120 onto a print medium 180 (e.g., paper) via a printer 160. The resulting print medium 180 may be printed in color and/or in any of a number of gray shades, including black and white, via Cyan, Magenta, Yellow, and blacK (i.e., CMYK). The host system 110 may comprise any computing device, such as a personal computer, a server, or even a digital imaging device, such as a digital camera or a scanner. The sheet image 120 may be any file or data that describes how an image on a sheet of print medium 180 should be printed. For example, the sheet image 120 may include PostScript data, Printer Command Language (PCL) data, portable document format (PDF) data, and/or any other printer language data. The print controller 140 processes the sheet image to generate a bitmap 150 for printing to the print medium 180 via the printer 160. The printing system 130 may be a high-speed printer operable to print relatively high volumes (e.g., greater than 100 pages per minute). The print medium 180 may be continuous form paper, cut sheet paper, and/or any other tangible medium suitable for printing. The printing system 130, in one generalized form, includes the printer 160 that presents the bitmap 150 onto the print medium 180 (e.g., via toner, ink, etc.) based on the sheet image 120.

Figure 2:
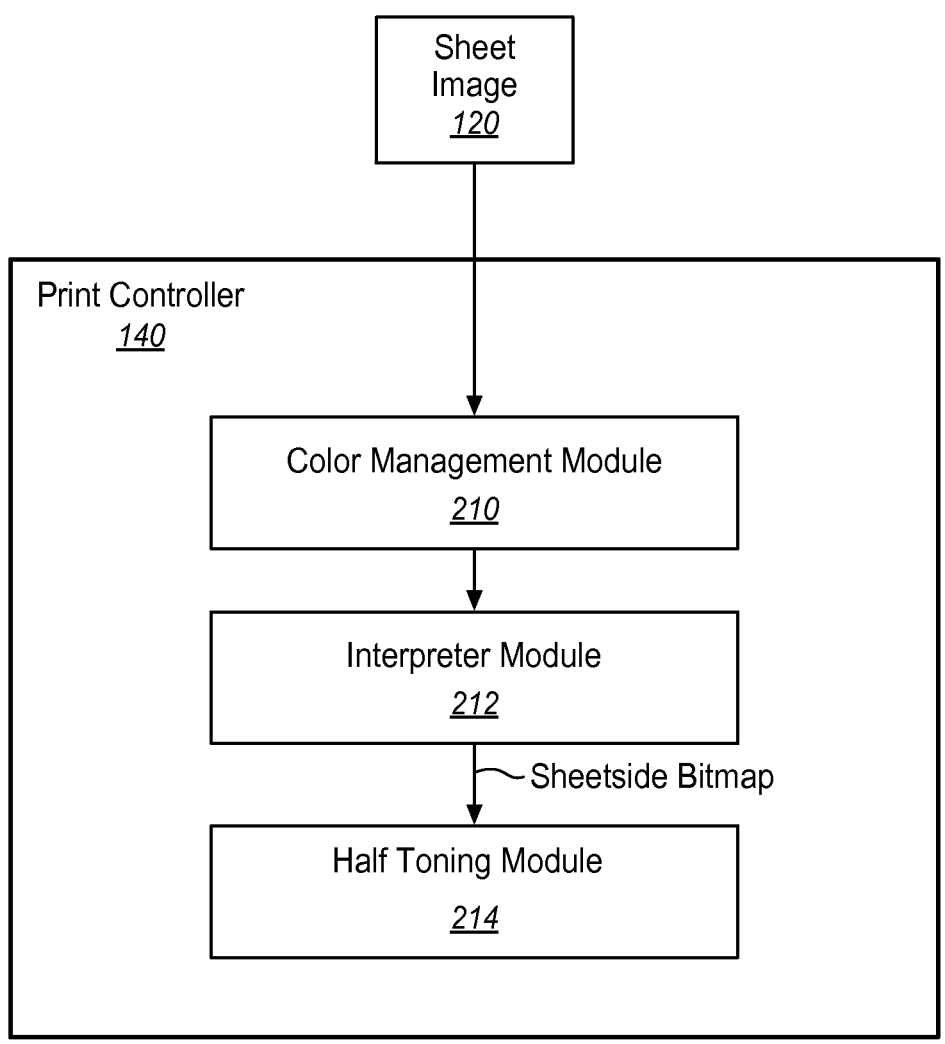
FIG. 2 is a block diagram illustrating a print controller in an exemplary embodiment.

The print controller 140 may be any system, device, software, circuitry and/or other suitable component operable to transform the sheet image 120 for generating the bitmap 150 in accordance with printing onto the print medium 180. In this regard, the print controller 140 may include processing and data storage capabilities. FIG. 2 is a block diagram illustrating an exemplary print controller 140. The print controller 140, in its generalized form, includes an interpreter module 212, a halftoning module 214, and a color management module 210. These separate components may represent hardware used to implement the print controller 140. Alternatively or additionally, the separate components may represent logical blocks implemented by executing software instructions in a processor of the printer controller 140. Accordingly, the invention is not intended to be limited to any particular implementation as such may be a matter of design choice.

The interpreter module 212 is operable to interpret, render, rasterize, or otherwise convert images (i.e., raw sheetside images such as sheet image 120) of a print job into sheetside bitmaps. The sheetside bitmaps generated by the interpreter module 212 are each a 2-dimensional array of pixels representing an image of the print job (i.e., a CTI), also referred to as full sheetside bitmaps. The 2-dimensional pixel arrays are considered "full" sheetside bitmaps because the bitmaps include the entire set of pixels for the image. The interpreter module 212 is operable to interpret or render multiple raw sheetsides concurrently so that the rate of rendering substantially matches the rate of imaging of production print engines.

The halftoning module 214 is operable to represent the sheetside bitmaps as halftone patterns of toner. For example, the halftoning module 214 may convert the pixels to halftone patterns of CMYK toner for application to the paper. Once computed, the halftoning module 214 transfers the converted sheetside bitmaps to the printer 160 to apply the toner to the paper. The print controller 140 may further include other modules such as a print job storage system, a raw data preprocessing system, and a bitmap processing system, etc.

Figure 3:
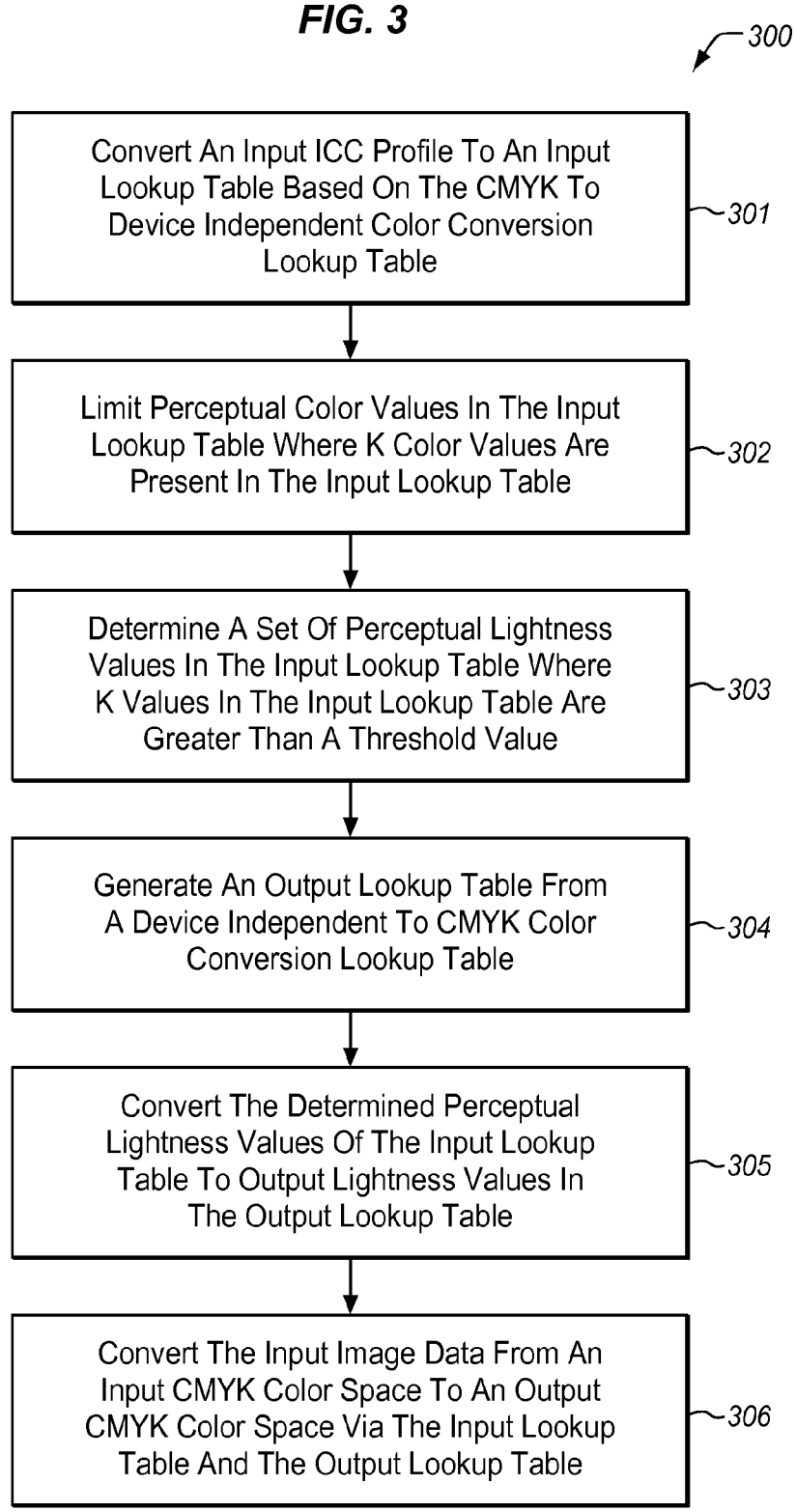
FIG. 3 is a flow chart illustrating a method of CMYK to CMYK color conversion in an exemplary embodiment.

The color management module 210 comprises hardware, software, firmware, or any combination thereof, which is operable to convert input image data of the sheet image 120 from one CMYK color space to another. For example, the color management module 210 may convert image data of one device operating in a CMYK color space to a CMYK color space of another device. In doing so, the color management module 210 preserves or maintains the K color values of the input image data during the CMYK to CMYK color conversion. As noted above, color conversion from CMYK to CMYK while preserving K color values is difficult for certain types of image data, such as in PostScript and PDF processing. FIG. 3 is a flow chart 300 illustrating a method of CMYK to CMYK color conversion in an exemplary embodiment that preserves the K color values during the CMYK to CMYK color conversion. In doing so, the method provides for modifying input and output ICC profiles used in the CMYK to CMYK color conversion process.

The method of the flowchart 300 initiates with the color management module 210 converting an input ICC profile to an input lookup table based on a CMYK to device independent color conversion lookup table, in the process element 301. For example, the color management module 210 is configured with an input ICC profile and an output ICC profile. The input ICC profile is associated with a color lookup table used to convert the CMYK color values of the input image data to a device independent color space such as CIEL*a*b*. The input ICC profile is typically used to convert the input CMYK image data to be device independent color space. The color management module 210 may alter this input ICC profile to form the input lookup table in a manner that preserves the K color values during the CMYK to CMYK color conversion. Generally, the input lookup table is configured to be the same size as the CMYK to device independent color conversion lookup table. Additionally, the CMYK to CMYK color conversion is generally performed according to a particular rendering intent (e.g., colorimetric, perceptual, or saturation).

With the input lookup table generated, the color management module 210 limits perceptual color values in the input lookup table where K color values are present in the input lookup table, in the process element 302. For example, the input lookup table translates the CMYK color values of the input image data to perceptual color values of the CIEL*a*b* color space. When one of these CMYK to perceptual color value translations includes a color value of K that is greater than zero (e.g., an amount of toner or ink in the K color plane that is greater than zero), the color management module 210 may "zero out" a* and b*color values. Thereafter, the color management module 210 determines a first set of perceptual lightness values in the input lookup table where K color values in the input lookup table are greater than a threshold value, in the process element 303. For example, the color management module 210 may determine the perceptual lightness values (e.g., L* values in CIEL*a*b*) in the input lookup table where K color values are maximum (i.e., 100%). The color management module 210 may record these perceptual lightness values in the input lookup table to assist in the configuration of the output lookup table (described below), generally concluding the configuration of the input lookup table for the CMYK to CMYK color conversion. From there, the method of the flowchart 300 is generally directed to the generation of the output lookup table and the subsequent CMYK to CMYK color conversion process.

To generate the output lookup table, the color management module 210 uses a device independent to CMYK color conversion lookup table, in the process element 304. For example, the output ICC color profile may be associated with a CIEL*a*b*to CMYK color conversion lookup table. The color management module 210 may generate the output lookup table based on the CIEL*a*b* to CMYK color conversion lookup table, initially configuring it with the same size and color values. In doing so, the color management module 210 may also configure a B2A tag in the output profile to a 49×49×49 color lookup table. Thereafter, the color management module 210 may convert the recorded perceptual lightness values of the input lookup table (i.e., from the process element 303) to output lightness values in the output lookup table, in the process element 305. For example, the color management module 210 may interpolate the recorded perceptual lightness values of the input lookup table to incorporate them within a range of lightness values in the output lookup table. This portion of the flowchart 300 generally completes the configuration of the output lookup table.

With the input and output lookup tables configured, the color management module 210 may convert the input image data from a first CMYK color space to a second CMYK color space in the process element 306. For example, the input lookup table may be used by the color management module 210 to convert the input CMYK image data to a CIEL*a*b* color space and then convert that image data back to CMYK color space of the output device via the output lookup table.

Figure 4:
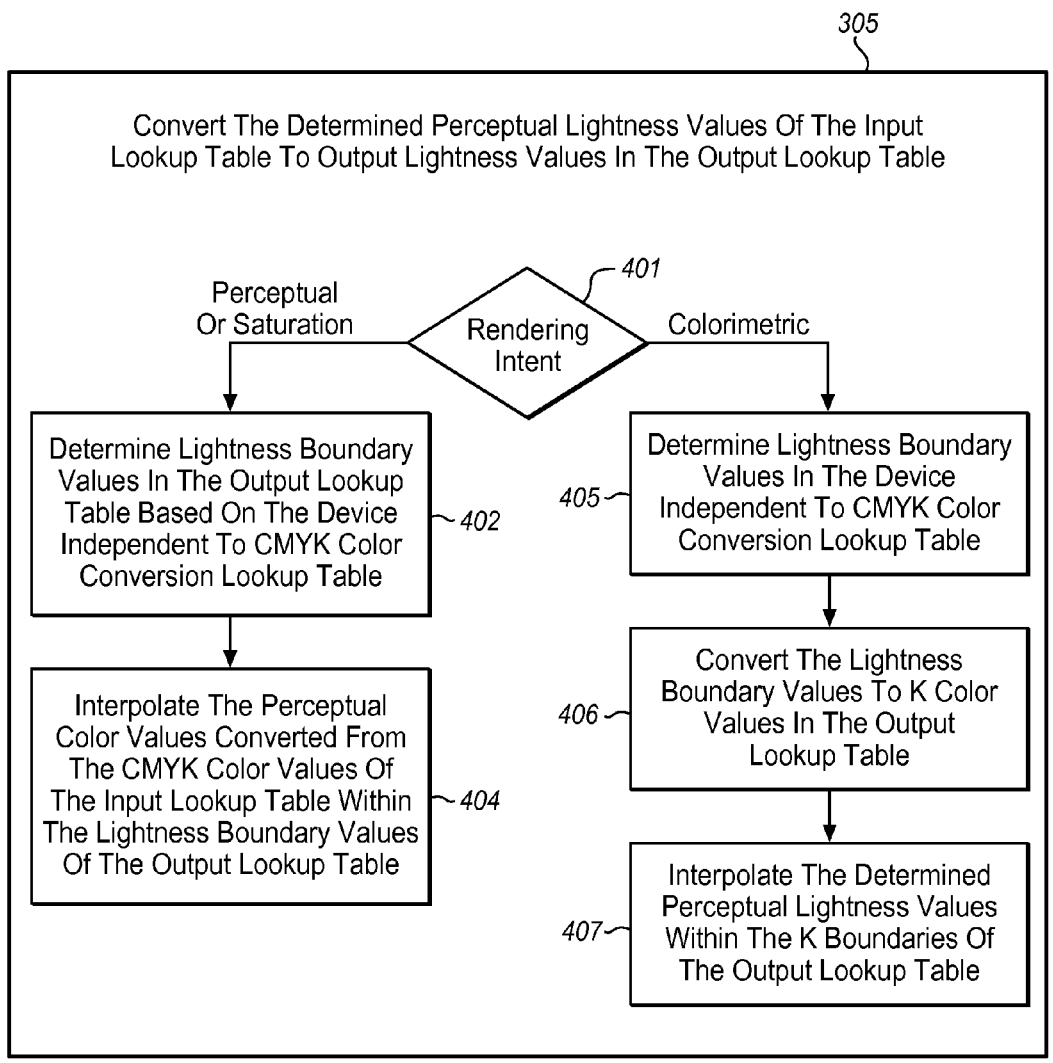
FIG. 4 is a flow chart illustrating interpolation of lightness values in the CMYK to CMYK color conversion in an exemplary embodiment.

As mentioned, this conversion process may be performed according to a particular rendering intent. In this regard, the interpolation of lightness values within the output lookup table may depend on the rendering intent being used. FIG. 4 is a flow chart 305 illustrating the interpolation of lightness values in the CMYK to CMYK color conversion according to various rendering intents in an exemplary embodiment. For example, the color management module 210, in converting the determined perceptual lightness values of the input lookup table to the output lightness values in the output lookup table may determine a particular rendering intent being used in the process element 401.

If the rendering intent is a colorimetric rendering intent, the color management module 210 may access the device independent to CMYK color conversion lookup table used to generate the output lookup table. In accessing the device independent to CMYK color conversion lookup table, the color management module 210 may determine lightness boundary values within that lookup table in the process element 405. For example, the color management module 210 may determine the lightness boundary values $L_{k+}$ and $L_{k-}$ within the device independent to CMYK color conversion lookup table. These boundary values may represent grid points as infimum and supremum to $L_k$ in the device independent to CMYK color conversion lookup table. Thereafter, the color management module 210 may convert the lightness boundary values to K color values in the output lookup table, in the process element 406. For example, the color management module 210 may convert both $L_{k+}$, 127.5, 127.5 CIEL*a*b* color values and $L_{k-}$, 127.5, 127.5 CIEL*a*b* color values to CMYK color values of C=0, M=0, Y=0, and K=255 (i.e., K=100%). With these values converted, the color management module 210 may interpolate the perceptual lightness values of the input lookup table (i.e., those values recorded in the process element 303 of FIG. 3) within K boundaries of the output lookup table, in the process element 407. For example, where the grid points are $L^* > L_{k-}$, the color management module 210 may obtain K color values by interpolating L* values using a portion of CMYK color values of C=0, M=0, Y=0, and K>0 of the output lookup table according to the relative colorimetric rendering intent, leaving the remaining CMYK color values unchanged to configure the output lookup table for the colorimetric rendering intent.

If the rendering intent being employed, however, is a perceptual rendering intent or a saturation rendering intent, the color management module 210 may determine. In doing so, the color management module 210 may convert CMYK color values for each CIEL*a*b* color value where L*=127.5, 127.5 (L, 0, 0) to a substitute CIEL*a*b* color value (e.g., L*' a*' b*') based on an A2B tag (CMYK to CIEL*a*b*) generated in the input lookup table according to the perceptual/saturation rendering intent. Thereafter, the color management module 210 may convert CMYK color values of the input lookup table to perceptual color values based on the second set of perceptual lightness values. For example, the color management module 210 may determine the lightness boundary value $L_{k+}$. This lightness boundary value $L_{k+}$ may represent the grid point in the device independent to CMYK color conversion lookup table (e.g., the B2A tag) that serves as an infimum to $L_k$. With the CMYK color values of the input lookup table converted to the perceptual color values, the color management module 210 may interpolate these perceptual color values within the lightness boundary values of the output lookup table to convert the recorded perceptual color values to output lightness values in the output lookup table, in the process element 404. For example, the color management module 210 may obtain K color values for the grid points where $L^* \geq L_{k+}$ by interpolating the substitute L*' values using a portion of the CMYK color values of C=0, M=0, Y=0, K>0 of the output lookup table, while leaving the remaining CMYK color values unchanged to configure the output lookup table for the rendering intent. If the rendering intent is a saturation rendering intent, the color management module 210 may also filter certain color values in the output lookup table to smooth single K color value transitions in the neutral axis in the output lookup table.

Figure 5:
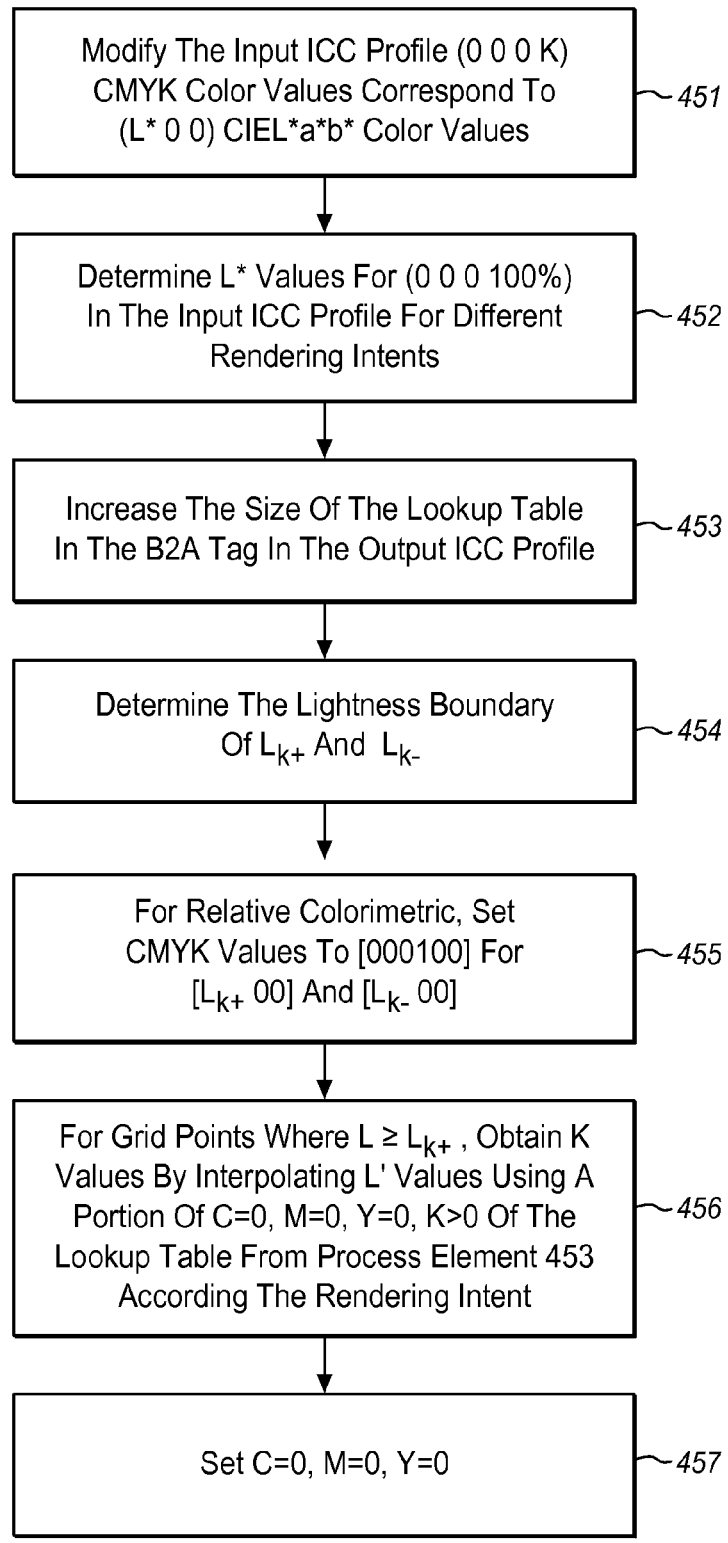
FIG. 5 is a flow chart illustrating a method of preserving K color values in a CMYK color conversion in an exemplary embodiment.

In another embodiment, the method of flowchart 450 of FIG. 5 provides for ICC image processing using a transform structure, such as a color conversion lookup table, for the input and output ICC profiles. The input ICC profile may describe an input color space to a Profile Connection Space (PCS) color conversion and the output ICC profile may describe a PCS to output color space conversion. This process includes a "preserve K" feature that produces K output (i.e., [000K1]) when an input color is K only (i.e., 0, 0, 0, K0) for CMYK to CMYK color conversions. Alternatively or additionally, the process may produce a K only output (i.e., [000K1]) if the input color includes equal amounts of Red Green Blue (RGB) colorants (i.e., R0=G0=B0 for RGB to CMYK color transforms. The process may also be operable to produce K only output (i.e., [000K1]) for gray to CMYK color conversions.

These color transforms may be implemented according to a particular rendering intent. In doing so, the color management module 210 may modify a* and b* values on a neutral axis of the input ICC profile in the process element 451. For example, the color management module 210 may convert the content of a given input ICC profile into the single high resolution 16 bit color conversion lookup table. If the color conversion lookup table is a CMYK to L*a*b*color conversion lookup table, the a* and b*color values are set to zero for all [000K] nodes. If the color conversion lookup table is an RGB to L*a*b*color conversion lookup table, the a* and b*color values are set to zero for all R=B=G nodes. If the color conversion lookup table is a gray to L*a*b*color conversion lookup table, the a* and b*color values are set to zero for all nodes.

Thereafter, the color management module 210 may determine L*color values of the input an ICC profile from various rendering intents in the process element 452. For example, if the color conversion is a CMYK color conversion, the L*color values correspond to the lightness of the [000100] node. If the color conversion is an RGB color conversion, the L* color values correspond to the lightness of the [000] node. If the color conversion is a gray color conversion, the L*color values correspond to the lightness of the [0] node.

With the input ICC profile modified, the color management module 210 may modify CMYK values on a neutral axis in output ICC profile. For example, the color management module 210 may increase the size of the color lookup table in the B2A tag in the output ICC profile in the process element 453. In doing so, the color management module 210 may convert the content of a given input ICC profile into the single 16 bit color conversion lookup table. The color management module 210 may then determine the lightness boundary $L_{k+}$ and $L_{k-}$ in the process element 454. If the rendering intent is a relative colorimetric rendering intent, the lightness boundaries $L_{k+}$ and $L_{k-}$ are the grid points in the color conversion lookup table of the B2A1 tag and are served as a min and a max to L* obtained in the process element 451. Next, the color management module 210 may set the CMYK color values to [000100] for [$L_{k+}$ 00] and [$L_{k-}$ 00], in the process element 455.

In the process element 456, where the grid points $L>L_{k-}$, the color management module 210 may obtain K values by interpolating L' values using the portion of C=0, M=0, Y=0, K>0 of the color conversion lookup table generated from the A2B1 tag of the output ICC profile (i.e., the color conversion lookup table obtained via the process element 453) and then establish C=0, M=0, and Y=0 in the process element 457. For example, if the rendering intent is a perceptual or saturation rendering intent, the lightness boundaries $L_{k+}$ and $L_{k-}$ are the grid points in the color conversion lookup table of the B2A0 or B2A2 tags and are served as a min and a max to L*. From there, the color management module 210 may convert the CMYK value for each L [L 0 0] node to a L'a'b' value using the color conversion lookup table generated from A2B0 tag. For the grid points with $L \geq L_{k+}$, the color management module 210 may obtain K values by interpolating L' color values using the portion of C=0, M=0, Y=0, K>0 of the color conversion lookup table generated from the output ICC profile with the perceptual rendering intent and then establish C=0, M=0, and Y=0.

Figure 6:
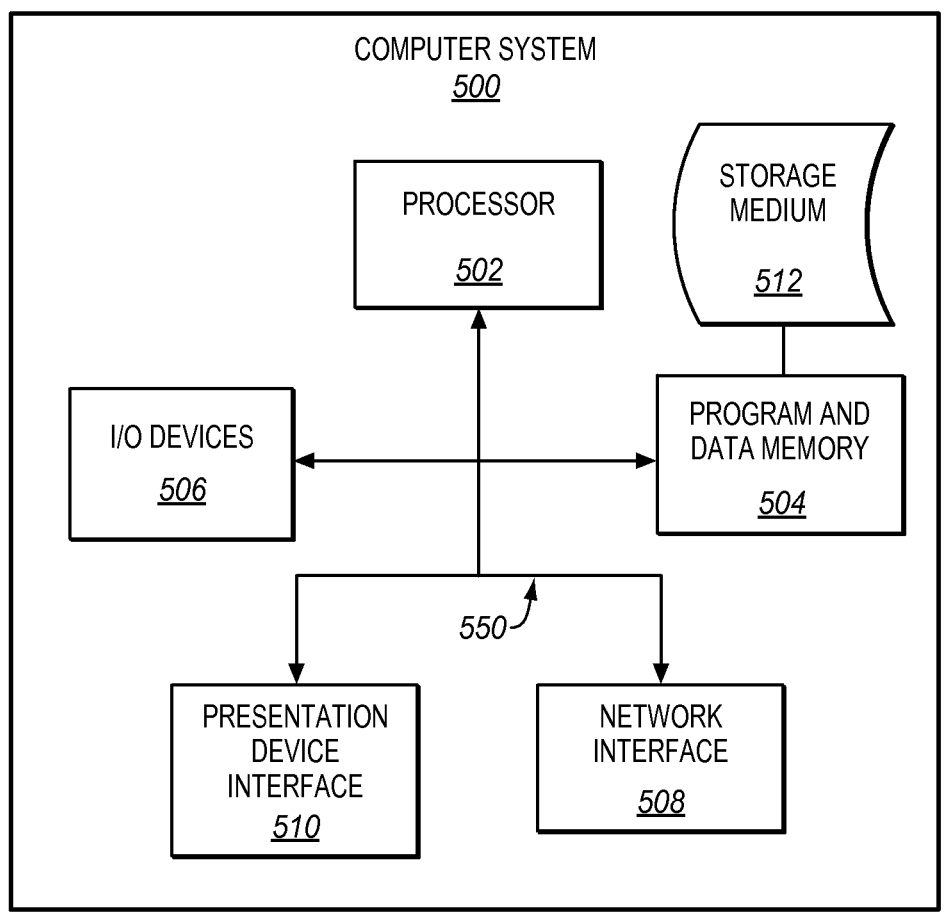
FIG. 6 illustrates a computer system operable to execute computer readable medium embodying programmed instructions to perform desired functions in an exemplary embodiment.

Embodiments of the invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 6 is a block diagram depicting a computer system 500 operable to provide features and aspects hereof by executing programmed instructions and accessing data stored on a computer readable storage medium 512.

Furthermore, embodiments of the invention can take the form of a computer program product accessible from a computer-usable or computer-readable medium 512 providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A computer system 500 suitable for storing and/or executing program code will include at least one processor 502 coupled directly or indirectly to memory elements 504 through a system bus 550. The memory elements 504 can include local memory employed during actual execution of the program code, bulk storage, and cache memories which provide temporary storage of at least some program code and/or data in order to reduce the number of times code and/or data must be retrieved from bulk storage during execution.

Input/output or I/O devices 506 (including but not limited to keyboards, displays, pointing devices, etc) can be coupled to the system either directly or through intervening I/O controllers. Network adapter interfaces 508 may also be coupled to the system to enable the computer system 500 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 510 may be coupled to the system to interface to one or more presentation device such as printing systems and displays for presentation of presentation data generated by processor 502.

In the context of printing, the invention is not intended to be limited to any particular type of printer. For example, the color conversion described herein may be employed in either ink or toner based printers. Moreover, the color conversion may be employed in printers ranging in size from small household printers to large commercial printers. In one embodiment, the color conversion may be implemented as software instructions operable with a host system to preserve K color values within input image data of a CMYK color space when converting the input image data to a CMYK color space of a printer. And, although shown in described respect to printing, the invention is not intended to be so limited. Rather, CMYK to CMYK color conversion may be used between a variety of devices. For example, any device operating in a CMYK color space that requires color conversion of image data for presentation with another device operating in a CMYK color space may be benefit from the CMYK to CMYK color conversion systems and methods described herein. Accordingly, although specific embodiments were described herein, the scope of the invention is not limited to those specific embodiments. The scope of the invention is defined by the following claims and any equivalents thereof.

We claim:

1. A method, operable with a processor, of performing CMYK to CMYK color conversion of input image data to preserve K color values in the input image data, the method comprising:
   accessing a CMYK to device independent color conversion in an input ICC profile;
   converting the input ICC profile to an input lookup table based on the CMYK to device independent color conversion lookup table;
   limiting perceptual color values in the input lookup table where K color values are present in the input lookup table;
   determining a set of perceptual lightness values in the input lookup table where K values in the input lookup table are greater than a threshold value;
   generating an output lookup table from a device independent to CMYK color conversion lookup table;
   converting the determined perceptual lightness values of the input lookup table to output lightness values in the output lookup table; and
   converting the input image data from an input CMYK color space to an output CMYK color space via the input lookup table and the output lookup table.

2. The method of claim 1, wherein converting the determined perceptual lightness values of the input lookup table to output lightness values in the output lookup table comprises interpolating the determined perceptual lightness values within lightness values of the output lookup table.

3. The method of claim 1, wherein the CMYK to device independent color conversion lookup table is a CMYK to CIEL*a*b* color conversion lookup table.

4. The method of claim 1, wherein the device independent to CMYK lookup table is a CIEL*a*b* to CMYK color conversion lookup table.

5. The method of claim 1, further comprising generating the input and output lookup tables based on a rendering intent, wherein the rendering intent is a relative colorimetric rendering intent, a perceptual rendering intent, or a saturation rendering intent.

6. The method of claim 5, further comprising, for the relative colorimetric rendering intent:
    determining lightness boundary values in the device independent to CMYK color conversion lookup table;
    converting the lightness boundary values to K color values in the output lookup table; and
    interpolating the determined perceptual lightness values within the K color values in the output lookup table.

7. The method of claim 5, further comprising, for the perceptual rendering intent or the saturation rendering intent:
    determining lightness boundary values in the output lookup table based on the device independent to CMYK color conversion lookup table; and
    interpolating the perceptual color values converted from the CMYK color values of the input lookup table within the lightness boundary values of the output lookup table.

8. The method of claim 7, further comprising, for the saturation rendering intent, filtering the converted image data to smooth color transitions between single K color values and other CMYK color values in the output lookup table.

9. A printing system configured to convert image data from an input CMYK color space to an output CMYK color space while preserving K color values in the input image data, the printing system comprising:
    a color management module configured to access a CMYK to device independent color conversion lookup table and an input ICC profile, convert the input ICC profile to an input lookup table based on the CMYK to device independent color conversion lookup table, limit perceptual color values in the input lookup table where K color values are present in the input lookup table, determine a set of perceptual lightness values in the input lookup table where K values in the input lookup table are greater than a threshold value, generate an output lookup table from a device independent to CMYK color conversion lookup table, convert the determined perceptual lightness values of the input lookup table to output lightness values in the output lookup table, and convert the input image data from the input CMYK color space to the output CMYK color space via the input lookup table and the output lookup table; and
    a printer operable to print the converted image data to a tangible medium.

10. The printing system of claim 9, wherein the color management module is further configured to interpolate the determined perceptual lightness values within lightness values of the output lookup table.

11. The printing system of claim 9, wherein the CMYK to device independent color conversion lookup table is a CMYK to CIEL*a*b* color conversion lookup table.

12. The printing system of claim 9, wherein the device independent to CMYK lookup table is a CIEL*a*b* to CMYK color conversion lookup table.

13. The printing system of claim 9, wherein the color management module is further configured to generate the input and output lookup tables based on a rendering intent, wherein the rendering intent is a relative colorimetric rendering intent, a perceptual rendering intent, or a saturation rendering intent.

14. The printing system of claim 13, wherein the color management module is further configured to, for the relative colorimetric rendering intent:
    determine lightness boundary values in the device independent to CMYK color conversion lookup table;
    convert the lightness boundary values to K color values in the output lookup table; and
    interpolate the determined perceptual lightness values within the K boundaries of the output lookup table.

15. The printing system of claim 13, wherein the color management module is further configured to, for the perceptual rendering intent or the saturation rendering intent:
    determine lightness boundary values in the output lookup table based on the device independent to CMYK color conversion lookup table; and
    interpolate the perceptual color values converted from the CMYK color values of the input lookup table within the lightness boundary values of the output lookup table.

16. The printing system of claim 15, wherein the color management module is further configured to, for the saturation rendering intent, filter the converted image data to smooth color transitions between single K color values and other CMYK color values in the output lookup table.

17. The printing system of claim 9, wherein the color management module is further configured to configure the input lookup table to be a same size as the CMYK to device independent color conversion lookup table.

18. A color management system configured to convert image data from an input color space to an output CMYK color space, the color management system comprising:
    a processor;
    an input ICC profile; and
    an output ICC profile that includes a B2A lookup table,
    wherein the processor is configured to convert the input ICC profile to CIEL*a*b* color values, determine lightness values in the input ICC profile for a plurality of rendering intents, increase a size of the B2A lookup table, determine a lightness boundary of the B2A lookup table, interpolate the determined lightness values within the output ICC profile according to the lightness boundary, and convert the image data from the input color space to the output CMYK color space via the converted ICC profile and the output ICC profile.

19. The color management system of claim 18, wherein the input color space is a CMYK color space, an RGB color space, or a grey color space.

* * * * *